(12) United States Patent
Sohn et al.

(10) Patent No.: US 11,590,579 B2
(45) Date of Patent: Feb. 28, 2023

(54) METHOD AND APPARATUS FOR ESTIMATING DEPTH OF MOLTEN POOL DURING PRINTING PROCESS, AND 3D PRINTING SYSTEM

(71) Applicant: Korea Advanced Institute of Science and Technology, Daejeon (KR)

(72) Inventors: Hoon Sohn, Daejeon (KR); Ikgeun Jeon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 101 days.

(21) Appl. No.: 17/118,890

(22) Filed: Dec. 11, 2020

(65) Prior Publication Data

US 2021/0197286 A1 Jul. 1, 2021

(30) Foreign Application Priority Data

Dec. 31, 2019 (KR) .................. 10-2019-0179189

(51) Int. Cl.
*B33Y 10/00* (2015.01)
*B33Y 30/00* (2015.01)
(Continued)

(52) U.S. Cl.
CPC .............. *B22F 12/90* (2021.01); *B22F 10/25* (2021.01); *B33Y 10/00* (2014.12); *B33Y 30/00* (2014.12);
(Continued)

(58) Field of Classification Search
CPC ........ B22F 12/90; B22F 10/25; B22F 10/368; B22F 10/80; B22F 10/00; B22F 10/10;
(Continued)

(56) References Cited

U.S. PATENT DOCUMENTS

| | | | | |
|---|---|---|---|---|
| 5,517,420 A | * | 5/1996 | Kinsman | ................ B23K 26/03 706/900 |
| 9,522,426 B2 | * | 12/2016 | Das | ........................ B22F 7/062 |

(Continued)

FOREIGN PATENT DOCUMENTS

| | | |
|---|---|---|
| CN | 107649804 A | 2/2018 |
| JP | 2016-060063 A | 4/2016 |
| JP | 2019-534186 A | 11/2019 |

OTHER PUBLICATIONS

Chinese Office Action (with Machine English Translation) dated Nov. 10, 2022 for Chinese Application No. 202011578078.3; 13 Pages.

*Primary Examiner* — Lawrence Averick
(74) *Attorney, Agent, or Firm* — Daly Crowley Mofford & Durkee, LLP

(57) ABSTRACT

Disclosed are a method and apparatus of estimating a depth of a molten pool formed during a 3D printing process, and a 3D printing system. A surface temperature of the molten pool is measure by taking a thermal image of a laminated printing object during the 3D printing process with a thermal imaging camera. The measured surface temperature is compared with a melting point of the base material to determine a surface boundary of the molten pool. The maximum lengths in x-axis and y-axis directions of a surface region of the molten pool defined by the surface boundary of the molten pool are determined as a length and a width of the surface of the molten pool, respectively. A maximum depth in the z-axis direction of the molten pool is determined in real time based on the length and width of the surface region of the molten pool.

6 Claims, 5 Drawing Sheets

(51) Int. Cl.
*G01B 21/18* (2006.01)
*G01J 5/00* (2022.01)
*B22F 12/90* (2021.01)
*B33Y 50/00* (2015.01)
*B22F 10/25* (2021.01)

(52) U.S. Cl.
CPC .............. *B33Y 50/00* (2014.12); *G01B 21/18* (2013.01); *G01J 5/004* (2013.01); *G01J 2005/0077* (2013.01)

(58) Field of Classification Search
CPC ......... B33Y 10/00; B33Y 30/00; B33Y 50/00; B33Y 50/02; B33Y 40/00; G01B 21/18; G01B 11/22; G01J 5/004; G01J 2005/0077; B29C 64/393; Y02P 10/25
See application file for complete search history.

(56) References Cited

U.S. PATENT DOCUMENTS

| | | | |
|---|---|---|---|
| 10,639,721 B2* | 5/2020 | Das | B22F 5/009 |
| 10,882,140 B2* | 1/2021 | Noriyama | B23K 26/144 |
| 2009/0206065 A1* | 8/2009 | Kruth | B23K 26/0665 |
| | | | 219/121.65 |
| 2014/0163717 A1* | 6/2014 | Das | B33Y 70/00 |
| | | | 700/119 |
| 2017/0182562 A1* | 6/2017 | Das | B33Y 50/02 |
| 2018/0029126 A1 | 2/2018 | Ng et al. | |
| 2018/0133840 A1* | 5/2018 | Noriyama | B22F 10/30 |

\* cited by examiner

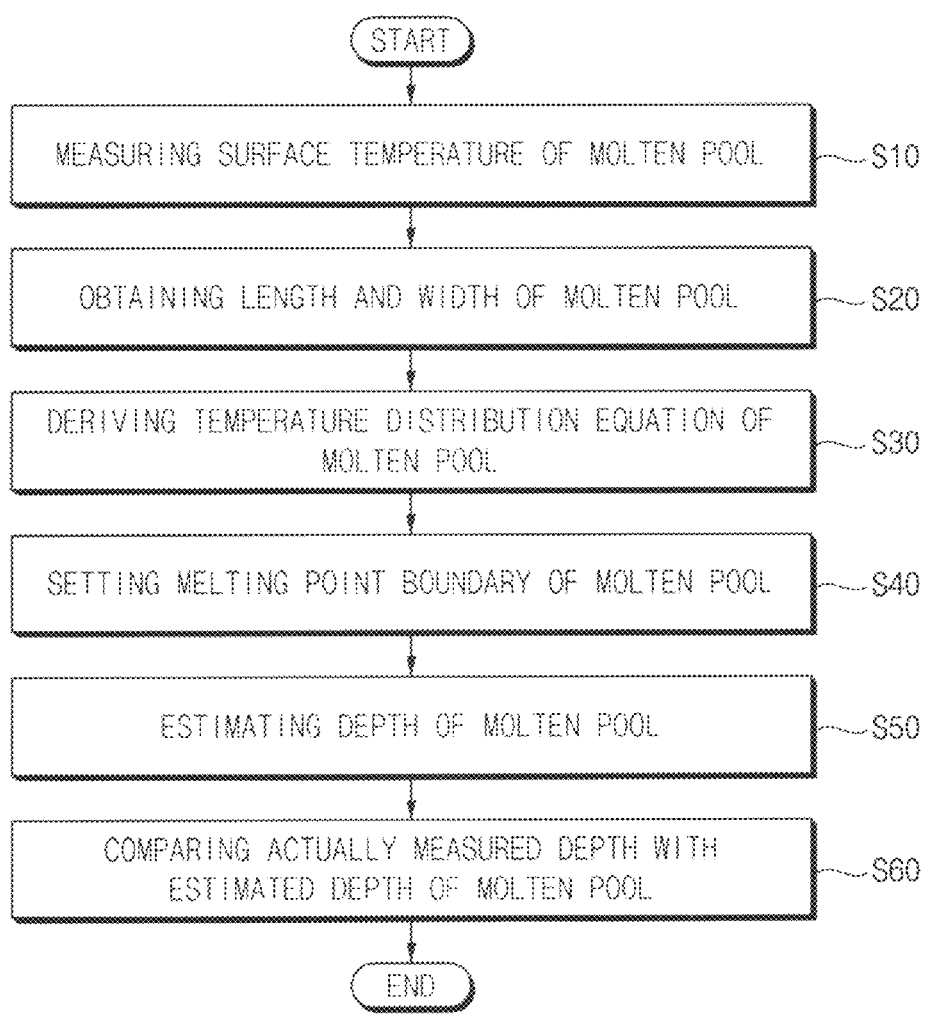

METHOD AND APPARATUS FOR ESTIMATING DEPTH OF MOLTEN POOL DURING PRINTING PROCESS, AND 3D PRINTING SYSTEM

CROSS-REFERENCE TO RELATED APPLICATION

This U.S. non-provisional application claims priority under 35 USC § 119 from Korean Patent Application No. 10-2019-0179189, filed on Dec. 31, 2019 in the Korean Intellectual Property Office (KIPO), the disclosure of which is hereby incorporated by reference in its entirety.

BACKGROUND

1. Technical Field

Some embodiments of the present disclosure relates to a 3D printing technology, and more particularly, to a technology for estimating the depth of a molten pool formed during a 3D printing process in real time.

2. Discussion of the Related Art

The 3D printing is known as a manufacturing technology for producing a 3D object. For the 3D printing of the 3D object, it is processed in a way that stacks layer by layer based on the 3D model data processing information. The 3D printing technology has advantages that facilitate realization of a complex shape, a shape formed inside a product, etc. Due to these advantages, the 3D printing technology is in the spotlight as a high value-added technology that makes it easy to manufacture various products such as various industrial parts and medical materials.

The 3D printing process can be performed by dividing the shape of a 3D product into a number of 2D cross sections having a uniform or variable thickness, and forming the 2D cross sections to be stacked one by one. There are several known 3D printing methods such as a material extrusion method, a material jetting method, a binder jetting method, a sheet lamination method, a vat photo-polymerization method, a powder bed fusion method, a directed energy deposition (DED) method, etc. Among them, the DED method is a method of applying laser energy to metal powder or wire material to be melted and fused, and is widely used because of its advantages that it can use inexpensive commercial materials compared to other methods, form a lamination on existing 3D shapes, and have superior mechanical properties compared to other methods.

In the 3D printing according to the DED method, a molten pool is formed when a laser beam irradiated from a laser source is irradiated to the substrate, and metal powder is supplied onto the molten pool to form a lamination. At this time, the length, width, and depth of the molten pool generated in the base material are important factors in determining the lamination quality of the 3D printing. In particular, the depth of the molten pool is an important factor in determining the tensile strength of a printed part, but it cannot be directly measured because it does not appear on the surface.

SUMMARY

Some embodiments of the present disclosure provide an apparatus and method capable of estimating the depth of a molten pool generated in a base material during the 3D printing process.

In one aspect, some embodiments of the present disclosure provide a method of estimating a depth of a molten pool formed during a 3D printing process. The method includes: measuring a surface temperature of the molten pool by taking a thermal image of an area of a laminated printing object including the molten pool of a base material formed on the laminated printing object during the 3D printing process with a thermal imaging camera; comparing the measured surface temperature of the laminated printing object with a melting point (Tm) of the base material to determine a boundary of a region exceeding the melting point as a surface boundary of the molten pool; determining maximum lengths in x-axis and y-axis directions of a surface region of the molten pool defined by the surface boundary of the molten pool as a length (a) and a width (b) of the surface of the molten pool, respectively; and estimating a maximum depth (d) in the z-axis direction of the molten pool in real time based on the length (a) and the width (b) of the surface region of the molten pool. In the method, the estimated maximum depth (d) of the molten pool is determined by a z-axis coordinate value (Zmax) at a point (Xmax, 0, Zmax) where a derivative in length direction of a temperature relation, $\Phi=T(x, y=0, z)-Tm$, of the molten pool is 0, where $T(x, y=0, z)$ is a temperature of the molten pool when assuming that the maximum depth (d) point of the molten pool is located at a center(y=0) in a width direction (y-axis direction) of the molten pool.

In an embodiment, the method may further include measuring an actual depth of a cross section of the laminated printing object of the molten pool; and checking whether a difference between the measured actual depth and the estimated maximum depth of the molten pool is within a predetermined error range to verify validity of the estimated maximum depth.

In an embodiment, the method may further include taking a case where the difference between the measured actual depth and the estimated maximum depth of the molten pool exceeds the predetermined error range, as a case that an abnormality in depth of the molten pool has occurred.

In an embodiment, a temperature $T(x, y, z)$ of the molten pool may be defined by the following temperature distribution equation, $$T(x, y, z) = \frac{I_0}{2\pi K} \int_{x=-\frac{1}{2}a}^{x=\frac{1}{2}a} \int_{y=0}^{y=a\sqrt{1-\frac{x^2}{b^2}}} \frac{1}{R} \exp\left(-\frac{x^2+y^2}{\sigma^2}\right) \times \exp\left(-\frac{V(R+x)}{2\alpha}\right) dx dy,$$

where K is thermal conductivity of the base material; Io is an intensity scale factor; $R=\sqrt{x^2+y^2+z^2}$; V is a scanning velocity of the thermal imaging camera when photographing the base material surface; and Tm is a melting point of the base metal.

In an embodiment, the 3D printing process may be performed in a direct energy deposition (DED) method.

In an embodiment, the base material of the molten pool may be a metal material.

In another aspect, some embodiments of the present disclosure provide an apparatus to estimate a depth of a molten pool formed during the 3D printing process by using the method mentioned above. The apparatus includes a thermal imaging camera and a calculation unit. The thermal imaging camera is configured to measure a surface temperature of the molten pool by photographing a region of a laminated printing object including the molten pool of the base material during the 3D printing process. The calculation unit is configured to estimate the depth of the molten pool using the surface temperature of the molten pool measured by the thermal imaging camera. The calculation unit includes functions of: comparing the measured surface temperature of the laminated printing object with a melting point (Tm) of the base material to determine a boundary of a region exceeding the melting point as a surface boundary of the molten pool; determining maximum lengths in x-axis and y-axis directions of a surface region of the molten pool defined by the surface boundary of the molten pool as a length (a) and a width (b) of the surface of the molten pool, respectively; and estimating a maximum depth (d) in the z direction of the molten pool based on the length (a) and the width (b) of the surface region of the molten pool. The estimated maximum depth (d) of the molten pool is determined by a z-axis coordinate value (Zmax) at a point (Xmax, 0, Zmax) where a derivative in length direction of a temperature relation, $\Phi=T(x, y=0, z)-Tm$, of the molten pool is 0, where $T(x, y=0, z)$ is a temperature of the molten pool when assuming that the maximum depth (d) point of the molten pool is located at a center(y=0) in a width direction (y-axis direction) of the molten pool.

In an embodiment, the thermal imaging camera may be disposed such that at least a part of an optical path of the thermal imaging camera is coaxially with a laser beam irradiated from the laser source that melts a base material supplied to the laminated printing object.

In an embodiment, the apparatus may further include a beam splitter disposed on a beam path irradiated from the laser source; and an optical path converter disposed between the beam splitter and the thermal imaging camera to change a path of light, wherein the thermal imaging camera is disposed coaxially with the laser source.

In an embodiment, the beam splitter may be disposed between the laser source and a focus lens through which laser beam emitted from the laser source passes.

In an embodiment, the calculation unit may be configured to estimate the depth of the molten pool in real time during the 3D printing process.

In further another aspect, some embodiments of the present disclosure provide a 3D printing system includes a laser source, a base material supply source, a thermal imaging camera, and a calculation unit. The laser source is configured to irradiate a laser beam to melt a base material supplied to a laminated printing object into a molten pool. The base material supply source is configured to supply the base material to the laminated printing object. The thermal imaging camera is configured to measure a surface temperature of the molten pool by photographing a region of a laminated printing object including the molten pool of the base material during the 3D printing process. The calculation unit is configured to estimate the depth of the molten pool using the surface temperature of the molten pool measured by the thermal imaging camera.

The calculation unit may include functions of comparing the measured surface temperature of the laminated printing object with a melting point (Tm) of the base material to determine a boundary of a region exceeding the melting point as a surface boundary of the molten pool; determining maximum lengths in x-axis and y-axis directions of a surface region of the molten pool defined by the surface boundary of the molten pool as a length (a) and a width (b) of the surface of the molten pool, respectively; and estimating a maximum depth (d) in the z direction of the molten pool based on the length (a) and the width (b) of the surface region of the molten pool. The estimated maximum depth (d) of the molten pool may be determined by a z-axis coordinate value (Zmax) at a point (Xmax, 0, Zmax) where a derivative in length direction of a temperature relation, $\Phi=T(x, y=0, z)-Tm$, of the molten pool is 0, where $T(x, y=0, z)$ is a temperature of the molten pool when assuming that the maximum depth (d) point of the molten pool is located at a center(y=0) in a width direction (y-axis direction) of the molten pool.

In an embodiment, the calculation unit may be configured to estimate the depth of the molten pool in real time during the 3D printing process.

In an embodiment, the thermal imaging camera may be disposed such that at least a part of an optical path of the thermal imaging camera is coaxially with a laser beam irradiated from the laser source that melts a base material supplied to the laminated printing object.

In an embodiment, the system may further include a beam splitter disposed on a beam path irradiated from the laser source; and an optical path converter disposed between the beam splitter and the thermal imaging camera to change a path of light, wherein the beam splitter is disposed between the laser source and a focus lens through which laser beam emitted from the laser source passes.

In an embodiment, the base material may be a metal powder or a metal wire.

According to the embodiments of the present invention, the depth of the molten pool formed during the 3D printing process may be estimated in real time using a thermal imaging camera.

In addition, through the real-time estimation of the depth of the molten pool formed during the 3D printing process by real-time measurement of thermal image during the 3D printing process, it is possible to detect an abnormality in the depth of the molten pool. Thus, defective products due to the abnormal depth of the molten pool can be detected during the 3D printing process, and appropriate follow-up for defective products can be taken quickly.

BRIEF DESCRIPTION OF THE DRAWINGS

These and/or other aspects and advantages of the present general disclosure will become apparent and more readily appreciated from the following description of the embodiments, taken in conjunction with the accompanying drawings of which:

FIG. 2 is a flowchart of a method of estimating a depth of a molten pool in the 3D printing system according to an embodiment of the present invention.

DETAILED DESCRIPTION OF THE EMBODIMENTS

Figure 1:
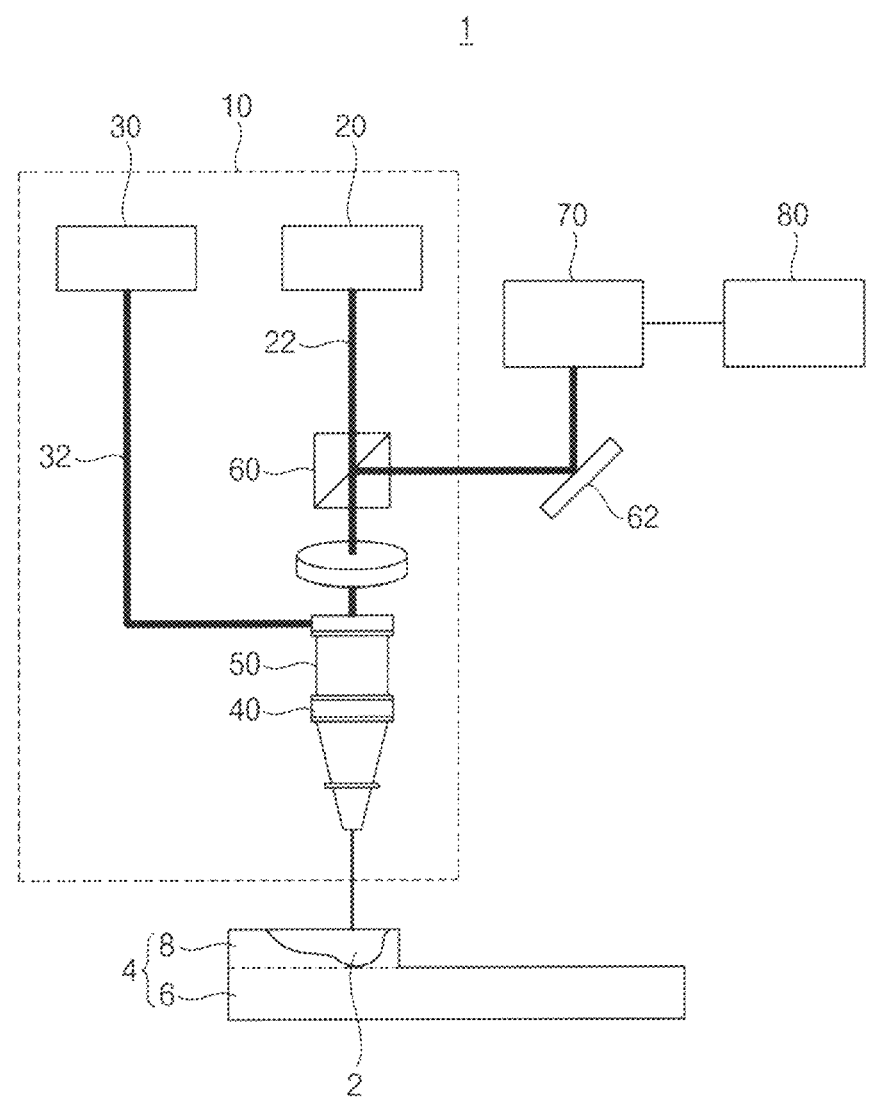
FIG. 1 is a block diagram of a 3D printing system according to an embodiment of the present invention.

Hereinafter, embodiments of the present disclosure will be described in detail with reference to the accompanying drawings. The present disclosure may be implemented in various different forms, and is not limited to the embodiments described herein. In the drawings, parts irrelevant to the description are omitted in order to clearly describe the present disclosure, and the same reference numerals are assigned to the same or similar elements throughout the specification.

The 3D printing system according to an embodiment of the present invention is a system capable of melting a base material using a laser to form a three-dimensional object, and also estimating the temperature of the molten pool melted during the 3D printing process in real time. In this case, the 3D printing system according to an embodiment of the present invention may be a DED type 3D printing system capable of forming a 3D object by melting metal powder or metal wire with a laser.

FIG. 1 illustrates a configuration of a 3D printing system according to an embodiment of the present invention.

Referring to FIG. 1, in an example embodiment the 3D printing system 1 may include a laser source 20 for 3D printing, a base material supply source 30, a focus lens 40, a nozzle 50, and a thermal imaging camera 70 and a calculation unit (80).

In an example embodiment, the laser source 20 may irradiate a laser beam 22 to a laminated printing object 4. The laser beam 22 irradiated from the laser source 20 passes through the focus lens 40 and is incident on the laminated printing object 4. The laser beam 22 irradiated from the laser source 20 may pass through the nozzle 50 for supplying the base material while the laser beam 22 reaches a molten pool 2.

In an example embodiment, the base material supplied from the base material supply source 30 may be fed to the nozzle 50 in the form of, for example, metal powder or metal wire through a separate supply pipe 32. To supply the base material to the laminated printing object 4, the movement path of the base material in the nozzle 50 may be formed to be parallel to or oblique to the path through which the laser beam 22 passes. The base material supplied to the laminated printing object 4 may be melted by the laser source 20 to form the molten pool 2 in the laminated printing object 4.

The laminated printing object 4 may be formed as a three-dimensional object by laminating a plurality of layers. In FIG. 1, illustrated is an example state where the laminated printing object 4 is formed of, for example, a first layer 6 and a second layer 8, and the molten pool 2 is formed on the second layer 8.

In the 3D printing system 1 according to an embodiment of the present invention, the laser source 20, the base material supply source 30 and the supply pipe 32, the focus lens 40 and the nozzle 50 may form a general DED type 3D printer 10. The 3D printer 10 that can be applied to the 3D printing system 1 according to the example embodiment of the present invention is not limited to the DED type 3D printer. If any 3D printer can form the molten pool 2 using metal as the base material, it can be applied to the 3D printing system 1.

In the 3D printing system 1, a thermal imaging camera 70 may be provided to estimate the depth of the molten pool 2 formed in the laminated printing object 4.

In order to measure the surface temperature of the molten pool 2 with the thermal imaging camera 70, a beam splitter 60 may be installed between the laser source 20 and the focusing lens 40.

The beam splitter 60 may be disposed on a path through which the laser beam 22 irradiated from the laser source 20 travels to the molten pool 2 and change the path of light reflected from the molten pool 2. The light changed by the beam splitter 60 may pass through an optical path converter 62 and be photographed by the thermal imaging camera 70. The optical path converter 62 that converts the optical path may be, for example, a reflecting mirror. Accordingly, the thermal imaging camera 70 can measure the surface temperature of the molten pool 2.

In an example embodiment, the thermal imaging camera 70 may be disposed coaxially with the nozzle 50 for irradiating laser light. Since the thermal imaging camera 70 is installed coaxially with the nozzle 50 of the 3D printer, it is possible to continuously photograph the laminated printing object 4 without controlling the position of the thermal imaging camera 70.

In an example embodiment, the thermal imaging camera 70 may be installed in the 3D printer together with the optical path converter 62 and the beam splitter 60 to measure the surface temperature of the molten pool 2 of the 3D printer.

In the 3D printing system 1 according to an example embodiment, the calculation unit 80 may be provided to estimate the depth of the molten pool 2 by using the surface temperature of the molten pool 2 measured by the thermal imaging camera 70.

Hereinafter, a method of estimating the depth of the molten pool 2 in the calculation unit 80 of the 3D printing system 1 will be described with reference to different drawings.

Figure 3A:
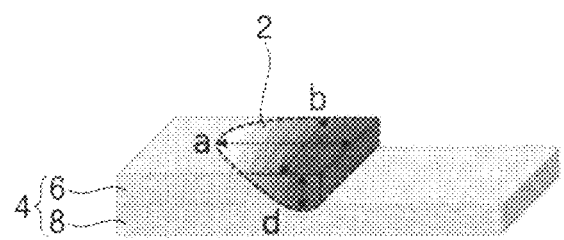
FIG. 3A is a model for predicting a molten pool temperature distribution, which is a schematic diagram showing the length, width, and depth of a molten pool formed on a base material.
Figure 3B:
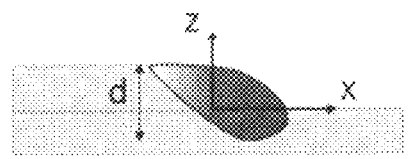
FIGS. 3B and 3C are a cross-sectional view and a plan view of the molten pool, respectively.
Figure 4A:
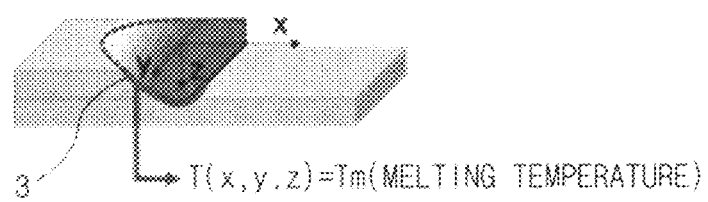
FIG. 4A is a view showing a coordinate system for obtaining the boundary surface of the molten pool formed on the base material.
Figure 4B:
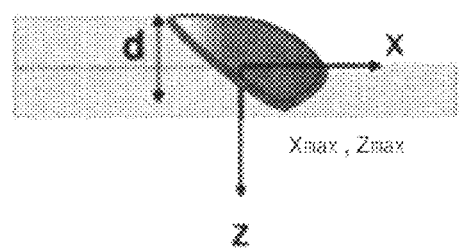
FIG. 4B is a view showing coordinates corresponding to the depth of the molten pool in a cross-sectional view of the molten pool.

FIG. 2 is a flowchart of a method for estimating the depth of a melt pool of the 3D printing system 1 according to an example embodiment of the present invention. FIG. 3A shows the length, width, and depth of the molten pool formed on the base material, and FIG. 3B shows a cross-sectional view and a plan view of the molten pool. FIG. 4A shows a coordinate system for obtaining the boundary surface of the molten pool formed on the base material, and FIG. 4B shows the coordinates corresponding to the depth of the molten pool in a cross-sectional view of the molten pool.

With reference to FIG. 2, the method of estimating the depth of the molten pool 2 may be performed by the calculation unit 80 of the 3D printing system 1 according to an example embodiment. The method may include the steps of measuring the surface temperature of the molten pool 2 formed during the 3D printing process (S10); obtaining the length and width of the molten pool (S20); deriving a temperature distribution equation of the molten pool 2 (S30); setting a melting point boundary of the molten pool 2 (S40); estimating the depth of the molten pool 2 in which the boundary is set using the temperature distribution equation (S50); and comparing an actually measured depth and an estimated depth of the molten pool 2 (S60).

First, in the step (S10) of measuring the surface temperature of the molten pool 2 of the base material formed on the laminated printing object 4 during the 3D printing process (S10), the thermal imaging camera 70 may take thermal images of the area of the laminated printing object 4 including the molten pool 2. Through the photographed thermal images, the surface temperature of the molten pool 2 can be measured.

In the 3D printing, at least a part of the base material on the laminated printing object 4 heated to a melting point or higher by a laser beam 22 may form the molten pool 2, and when the molten base material is lowered to a temperature below the melting point, it is solidified. Since the temperature interface 3 exceeding the melting point of the base material in the measured temperature image is a boundary of the molten pool 2, the length and width of the temperature interface 3 may be determined as the length and width of the molten pool 2 (S20).

Figure 3C:
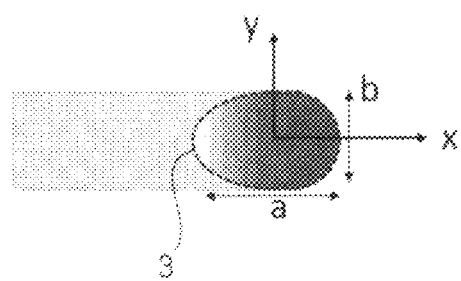

That is, in the molten pool 2 as shown in FIGS. 3A to 3C, the maximum lengths in the x-axis direction and y-axis direction of the surface area of the molten pool 2 shown outside may be the length a and width b of the molten pool 2, respectively. The depth d in the z-axis direction of the molten pool 2 may not be measured directly from the surface temperature of the molten pool 2, but can be estimated by the calculation unit 80 based on the length a and width b of the molten pool 2.

Here, the length a and width b of the molten pool 2 may be obtained based on the temperature interface 3 exceeding the melting point of the base material. The length a and width b of the molten pool 2 thus determined may be entered into a pre-set temperature distribution prediction model of the molten pool 2 to derive a temperature distribution equation 1 of the molten pool 2 (S30).

The temperature distribution equation 1 may be as follows.

$$T(x, y, z) = \frac{I_0}{2\pi K} \int_{x=-\frac{1}{2}a}^{x=\frac{1}{2}a} \int_{y=0}^{y=a\sqrt{1-\frac{x^2}{b^2}}} \frac{1}{R} \exp\left(-\frac{x^2+y^2}{\sigma^2}\right) \times \exp\left(-\frac{V(R+x)}{2\alpha}\right) dxdy \quad (1)$$

Here, K is thermal conductivity of the base material, and Io is intensity scale factor. $R=\sqrt{x^2+y^2+x^2}$. V is a scanning velocity of the thermal imaging camera 70 when the thermal imaging camera 70 takes the thermal images of the surface of the base material, and Tm is a melting point of the base metal.

Through the temperature distribution equation of the molten pool 2 thus derived, the boundary surface 3 of the melting point of the molten pool 2 may be set as T(x, y, z)=Tm, as shown in FIG. 4A (S40).

Then, it can be expressed as the following equation.

$$\Phi=T(x,y,z)-Tm \quad (2)$$

Assuming that the maximum depth of the molten pool 2 is at the center in the width direction of the molten pool 2 of the laminated printing object 4, the y-axis coordinate value corresponding to the maximum depth of the molten pool 2 may be set to 0.

When y=0, Equation (2) can be written as follows.

$$\Phi=T(x,y=0,z)-Tm \quad (3)$$

In the case of y=0, when Equation (3) is differentiated in the x-axis direction, the differential value of Φ at the maximum depth point of the molten pool 2 will be 0 and can be written as follows.

$$\frac{\partial \Phi}{\partial x} = 0 \quad (4)$$

The point at which the gradient in the x-axis direction is 0 may be defined as a point (Xmax, Zmax) in the x-axis direction as shown in FIG. 4B.

Here, the value of Zmax can be estimated as the depth of the molten pool 2 (S50).

It can be confirmed whether the estimated depth of the molten pool 2 is the same as the actual depth of the molten pool 2. To this end, the actual laminated printing object 4 may be cut and the length of the cross section may be measured to know the actual depth of the molten pool 2. It is possible to verify the validity of the estimated depth value of the melt pool 2 by comparing the measured actual depth of the molten pool 2 and the estimated depth of the molten pool 2 (S60).

In this way, it is possible to compare and verify the validity of the estimated value by comparing the directly measured depth and the estimated depth of the molten pool 2 after cutting the actual printing object 4. If the difference between the estimated depth and the actually measured depth of the molten pool 2 is within an allowable error range, the estimated depth can be regarded as the depth value of the molten pool 2, and can be used as the depth value of the molten pool 2 in a later 3D printing process.

If the difference exceeds the allowable error range, that is, if the estimated depth value of the molten pool 2 in the 3D printing process is out of a preset effective depth range, it can be determined in real time that a depth abnormality of the molten pool 2 has occurred during 3D printing. A 3D printing object in which the depth abnormality is detected may be recognized as a defective product and may be discarded or reprocessed.

As described above, the method for estimating the depth of the molten pool 2 during the 3D printing process according to the example embodiments of the present invention has the advantage of being able to check the depth abnormality of the molten pool in real time by estimating the depth of the molten pool in real time during the 3D printing process using the thermal imaging camera.

In the example embodiments described above, the 3D printer configured to estimate the depth of the molten pool during the 3D printing process with the thermal imaging camera and the calculation unit has been described as part of the 3D printing system. However, as another embodiment of the present invention, it will be possible to provide a device for estimating the depth of the molten pool formed during the 3D printing process separately or integrally with the 3D printer. The thermal imaging camera and the calculation unit may be installed in the existing 3D printer, and the surface temperature of the molten pool may be measured using the thermal imaging camera, and the calculation unit can estimate the depth of the molten pool using the measured surface temperature. It will be understood that an apparatus for estimating the depth of the molten pool formed during the 3D printing process is also included within the scope of the spirit of the present invention.

Although a few embodiments of the present general inventive concepts have been shown and described, it will be appreciated by those skilled in the art that changes may be made in these embodiments without departing from the principles and spirit of the general inventive concepts, the scope of which is defined in the appended claims and their equivalents.

What is claimed is:

1. A method of estimating a depth of a molten pool formed during a 3D printing process, comprising:
   measuring a surface temperature of the molten pool by taking a thermal image of an area of a laminated printing object including the molten pool of a base material formed on the laminated printing object during the 3D printing process with a thermal imaging camera;
   comparing the measured surface temperature of the laminated printing object with a melting point (Tm) of the base material to determine a boundary of a region exceeding the melting point as a surface boundary of the molten pool;

determining maximum lengths in x-axis and y-axis directions of a surface region of the molten pool defined by the surface boundary of the molten pool as a length (a) and a width (b) of the surface of the molten pool, respectively; and estimating a maximum depth (d) in the z-axis direction of the molten pool in real time based on the length (a) and the width (b) of the surface region of the molten pool, wherein the estimated maximum depth (d) of the molten pool is determined by a z-axis coordinate value (Zmax) at a point (Xmax, 0, Zmax) where a derivative in length direction of a temperature relation, $\Phi = T(x, y=0, z) - Tm$, of the molten pool is 0, where $T(x, y=0, z)$ is a temperature of the molten pool when assuming that the maximum depth (d) point of the molten pool is located at a center(y=0) in a width direction (y-axis direction) of the molten pool.

2. The method of claim 1, further comprising: measuring an actual depth of a cross section of the laminated printing object of the molten pool; and checking whether a difference between the measured actual depth and the estimated maximum depth of the molten pool is within a predetermined error range to verify validity of the estimated maximum depth.

3. The method of claim 1, further comprising taking a case where the difference between the measured actual depth and the estimated maximum depth of the molten pool exceeds the predetermined error range, as a case that an abnormality in depth of the molten pool has occurred.

4. The method of claim 1, wherein a temperature $T(x, y, z)$ of the molten pool is defined by the following temperature distribution equation, $$T(x, y, z) = \frac{I_0}{2\pi K} \int_{x=-\frac{1}{2}a}^{x=\frac{1}{2}a} \int_{y=0}^{y=a\sqrt{1-\frac{x^2}{b^2}}} \frac{1}{R} \exp\left(-\frac{x^2+y^2}{\sigma^2}\right) \times \exp\left(-\frac{V(R+x)}{2\alpha}\right) dxdy,$$

where K is thermal conductivity of the base material; Io is an intensity scale factor; $R=\sqrt{x^2+y^2+x^2}$; V is a scanning velocity of the thermal imaging camera when photographing the base material surface; and Tm is a melting point of the base metal.

5. The method of claim 1, wherein the 3D printing process is performed in a direct energy deposition (DED) method.

6. The method of claim 1, wherein the base material of the molten pool is a metal material.

* * * * *